May 10, 1938.  C. O'N. WEISSER ET AL  2,116,813
MEANS FOR PRESERVING FOOD
Filed Dec. 26, 1933  3 Sheets-Sheet 1

INVENTORS
Charles O'N. Weisser
Ernest H. Severson
BY John Flam
ATTORNEY

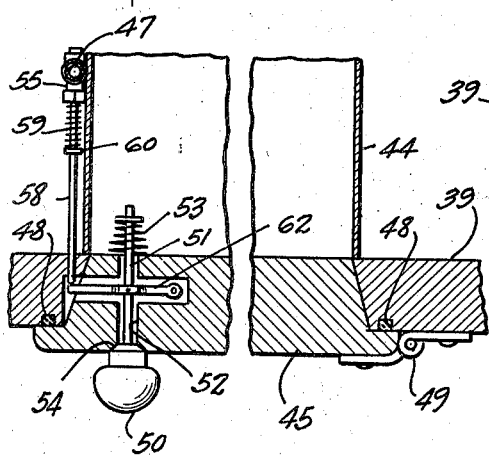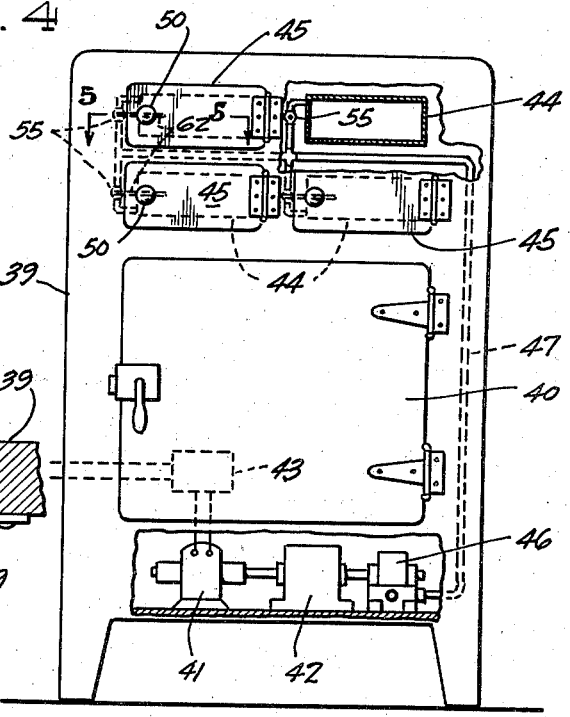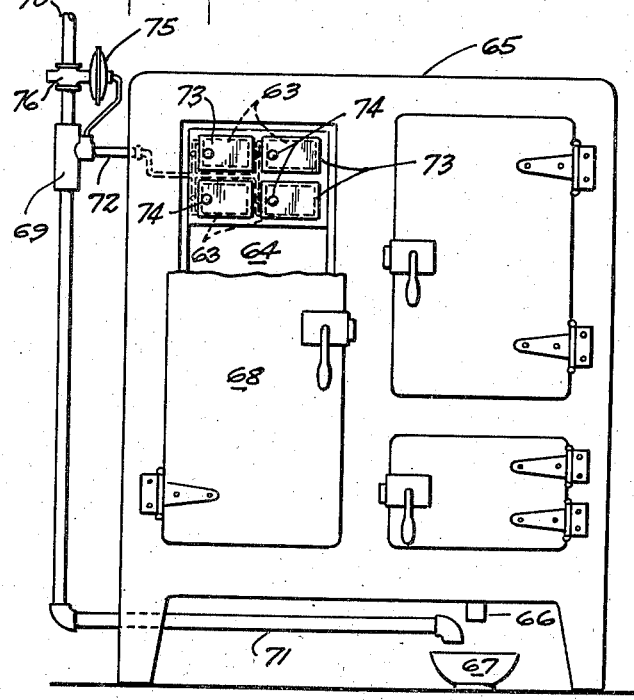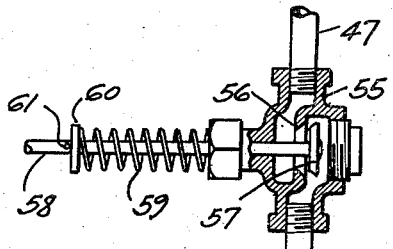

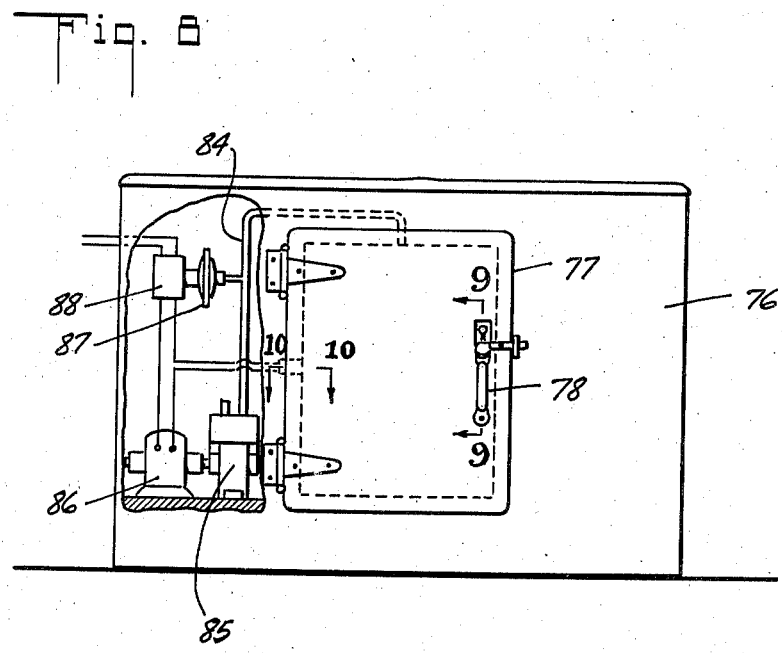
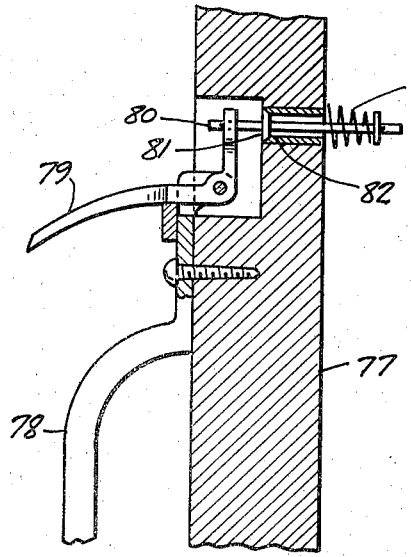
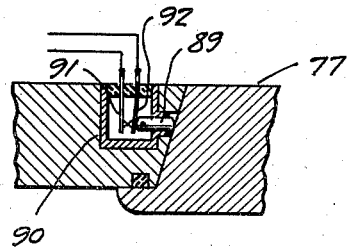

Patented May 10, 1938

2,116,813

UNITED STATES PATENT OFFICE 2,116,813

MEANS FOR PRESERVING FOOD

Charles O'N. Weisser and Ernest H. Severson, Los Angeles, Calif.

Application December 26, 1933, Serial No. 703,880

5 Claims. (Cl. 99—270)

This invention relates to a device for the preservation of foods, and especially by the aid of a refrigerator.

In order to keep articles of food such as meat, poultry, dairy products, fruits, vegetables, and fish, it is customary to utilize an ice box or a mechanical refrigerator. The food to be preserved for future consumption is usually placed on trays or on shelves in the box; or in the case of a store or butcher shop, the vendible food commodities may be hung on hooks in a comparatively large refrigerated chamber. In such cases, there is the usual difficulty that repeated opening of the box for removal or insertion of food, exposes the food to constant contamination. Furthermore, some foods, such as milk and butter, readily take on a disagreeable odor or flavor, or both, due to its permeation of odors from other foods, such as meat, fish, or cantaloupes.

It is one of the objects of this invention to improve in general, the mode of refrigeration of perishable foods.

It is another object of the invention to obviate the disadvantages (such as outside contamination and absorption of odor and flavor) present in prior systems of refrigeration.

These objects are attained by providing sealed compartments held below atmospheric pressure, in which the food is placed. In this way, several important results are obtained. The food is kept sealed against emission or absorption of odors and flavors; the pressure in the sealed container being below atmospheric, the protection against putrefaction is very materially improved over mere refrigeration; and the act of evacuation also automatically acts to seal the container.

It is another object of the invention to provide a convenient container of the character specified, which can readily be sealed and evacuated.

It is another object of the invention to provide a combined refrigeration, evacuating and sealing system that is reliable and effective in operation.

This invention possesses many other advantages, and has other objects which may be made more easily apparent from a consideration of several embodiments of the invention. For this purpose there are shown a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings:

Fig. 4 is a front elevation partly broken away, of a modified form of the invention;

Fig. 5 is an enlarged detail sectional view taken along plane 5—5 of Fig. 4;

Fig. 6 is an enlarged detail section of a control valve utilized in connection with the form of the invention shown in Fig. 4;

Fig. 7 is a front elevation, partly broken away, of still another form of the invention;

Fig. 8 is a front elevation partly broken away of a further modified form of the invention; and Figs. 9 and 10 are enlarged sectional views taken respectively along planes 9—9 and 10—10 of Fig. 8.

Figure 1:
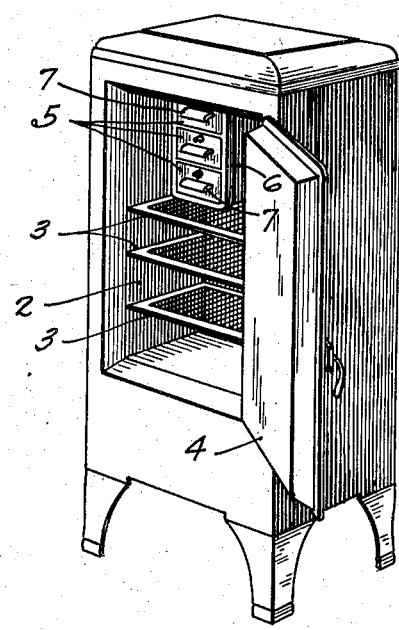
Figure 1 is a pictorial view of a refrigerator in which the invention is incorporated.
Figure 2:
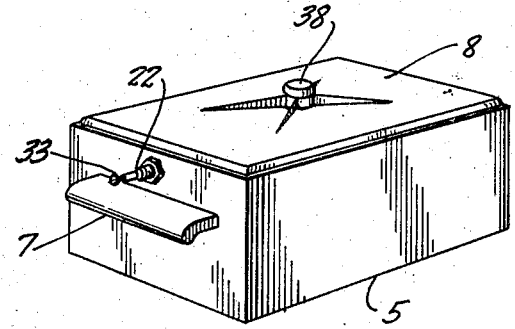
Fig. 2 is a pictorial view of one of the containers which may be used in connection with the refrigerator shown in Fig. 1.
Figure 3:
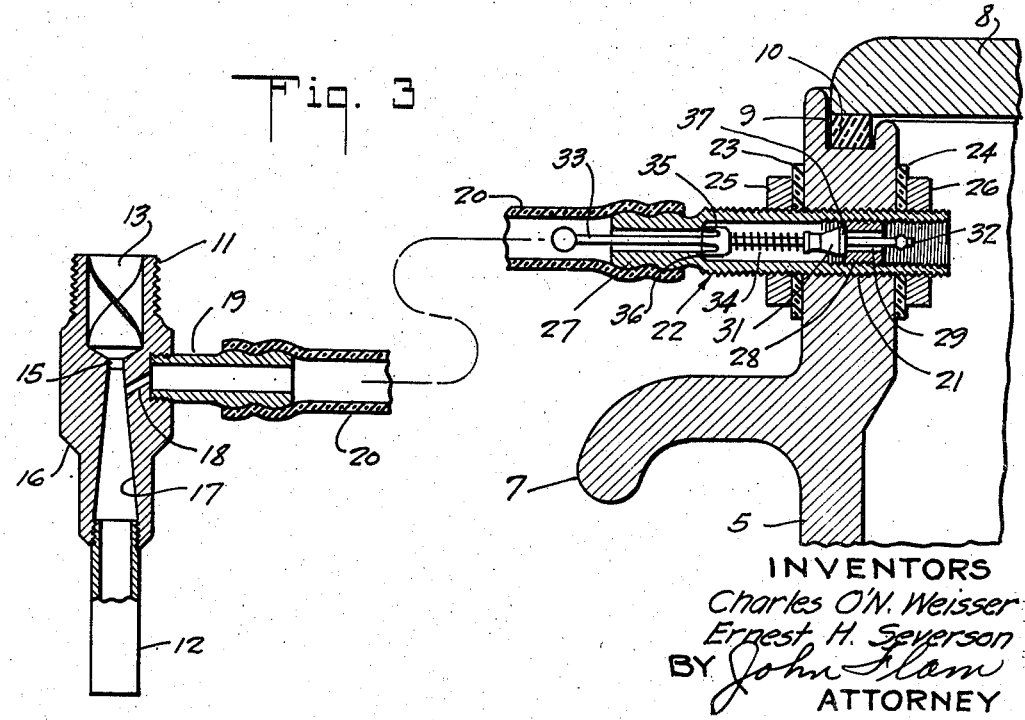
Fig. 3 is an enlarged fragmentary sectional view of the container shown in Fig. 2, in conjunction with an evacuating apparatus.

In the form of the invention illustrated in Figs. 1, 2 and 3, there is shown a conventional type of refrigerator. This refrigerator can be provided if necessary with a mechanical refrigerating system, or it can be refrigerated by the aid of ice. It includes in general a compartment 2, in which are located the usual grid shelves 3. A hinged door 4 can be provided for the front of the refrigerator 1.

Articles of food may of course be placed directly on the shelves 3; this is the usual mode of using a refrigerator. However, in the present instance there are provided one or more evacuated containers adapted to be placed inside of the compartment 2. These containers are illustrated at 5, and one of them is shown in greater detail in Fig. 2. The sealed evacuated containers 5 can serve effectively to assist in the preservation of food placed therein; and also in preventing egress or ingress of odors or flavors. Due to the evacuation of the container 5, the danger of contamination by contact with germ ladened air is very materially reduced. The degree of vacuum may be quite substantial; for example, the pressure inside of the container may be reduced to one-half or less of ordinary atmospheric pressure. These containers 5 in the form shown in Figs. 1, 2, and 3, are arranged to be removable for the purpose of filling with food articles as well as of facilitating its evacuation. Thus these containers are shown as supported in a frame 6 shown as suspended from the top of the compartment 2. Appropriately spaced supports may be provided in the frame 6 for each of the containers 5. To facilitate removal and insertion into the frame 6, each of the containers 5 can be provided with a pull handle 7.

In order to ensure cleanliness and durability, the main body of the container 5 as well as its cover 8 can conveniently be made from appropriate material, such as glass or metal, or porcelain enameled metal.

The arrangement is preferably such that the act of evacuating the container 5 while the cover 8 is in place also serves to seal the container by the aid of the air pressure acting on the outside surface of the cover 8. One mode in which this can be effected is shown to best advantage in Fig. 3. It is there seen that the upper wall of container 5 is widened to provide a groove 9. In this groove is provided a compressible gasket 10 which is thus placed between the cover 8 and the container 5. When the container 5 is evacuated, the gasket 10 is slightly compressed by the pressure of the outside air and the container is thereby sealed.

Evacuation of the container to the desired degree is obtained by the aid of a vacuum producing mechanism of any convenient type. However, it is preferred to use an aspirator or ejector type of evacuator, depending upon the flow of liquid such as water, past an opening connecting with the interior of the container 5. This mechanism is shown at the left hand portion of Fig. 3. It includes body 16 having a liquid inlet nipple 11 and a water outlet nipple 12. Nipple 11 can be detachably connected to a source of water supply, such as the ordinary kitchen faucet. Water flows in past a helical vane 13 located in nipple 11, and through a constricted throat 15 located in the body 16. The constricted opening 15 forms virtually a Venturi throat through which the water passes, and which joins the diverging opening 17 leading to the outlet nipple 12. The water flowing from outlet nipple 12 can be led to any appropriate drain. The passage of water past the throat 15 is thus accelerated by the action of the venturi, and as it passes past an opening 18 in the wall of the body 16, a suction effect is produced in a manner now well understood. This opening 18 leads to a nipple 19 threaded into the body 16. This nipple 19 can be connected as by a flexible rubber hose 20 or the like with the interior of the container 5. As indicated in Fig. 3, the flexible connection 20 is of indefinite length, and is made to suit requirements.

The container 5 has an aperture 21 in which is securely fastened a nipple structure 22. This is accomplished for example, by threading the external surface of nipple structure 22 and causing it to engage corresponding threads in aperture 21. To render the connection fluid tight, yielding washers 23—24 as of rubber or the like may be placed over each of the projecting parts of the structure 22; and check-nuts 25 and 26 can be threaded over the nipple body and tightened against washers 23—24 respectively.

The flexible connection 20 can have its end stretched over the nipple connection 27 extending from the nipple body 22. Thus the connection 20 connects the interior of container 5 with the nipple 19.

In order to maintain the vacuum inside of container 5 after the evacuating apparatus is disconnected therefrom, there is provided a valve which automatically acts to close the opening through nipple structure 22. A valve seat is formed for example as by the aid of a plug 28 threaded into the nipple body, and having a through aperture 29. Cooperating with this plug is a valve closure member 31 fastened to a valve stem 32 which extends through the aperture 29. This valve stem is also extended to form a headed rod 33 beyond the connection end 27. A compression spring 34 is inserted between a shoulder of the closure member 31 and a sliding collar 35 which engages an inner shoulder 36 formed in the inside of nipple body 22. The closure member 31 preferably carries a compressible washer 37, such as of rubber, to ensure a tight closure.

It is apparent that when the evacuating apparatus is operating, the spring 34 is compressed due to the suction in the connection 20. This causes the valve closure 31 to move to the left and thus to open the valve for the egress of air from container 5 around the stem 22. As soon as the suction ceases, the spring 34 acts to seat the closure 31. This closing action is assisted by atmospheric pressure when hose 20 is removed from the connection member 27. This evacuation of container 5 serves to seal the cover 8, and also assists in maintaining the valve 31 in closed position, due to the differential in pressure between the inside and the outside of the container.

This evacuation operation can be performed readily while the container 5 is removed from the refrigerator 1, and after the food to be preserved is placed therein. The combined action of refrigeration and evacuation ensures a very long period of preservation, impossible of attainment by only one of these two features. When it is desired, however, to remove the food from container 5, it is a simple matter to break the vacuum and thereby release the cover 8. This can be done by simply pulling outwardly on the rod 33, which causes the valve 31 to unseat and to permit the passage of atmospheric air through the nipple structure 22 into container 5.

As shown in Fig. 2, the cover 8 can, if desired, be provided with a knob 38 for facilitating removal thereof.

In the form just described, the evacuation of container 5 can be maintained by periodic use of the evacuating apparatus for a few minutes. In the form shown in Figs. 4, 5 and 6, the arrangement is such that the evacuation is automatic. In this form a refrigerator 39 is indicated having a latched main door 40. It is shown as being provided with an electric motor 41 and a compressor 42 driven thereby, for use in the refrigerating system in a well understood manner. The electric motor 41, which serves as a source of motion for driving the mechanical refrigerating system, can be automatically controlled as by the automatic switch 43 illustrated diagrammatically. This automatic control of motor 41 can be accomplished in accordance with temperature or pressure conditions, or both, as is common in mechanical refrigerators.

In the refrigerating compartment, there are provided one or more containers such as 44. In the present instance these containers are shown as provided with external doors 45 (Fig. 5) so as to make it possible to gain access to each of these containers without opening the main door 40; although it may be possible and it is sometimes preferable to have the doors located within the main refrigerated compartment.

Each of the containers 44 is arranged to be evacuated. Since these containers 44 are arranged to be permanently built into the refrigerator 39, it is possible to provide a mechanical pumping arrangement for evacuating all of these containers. This can be accomplished for example by the aid of a supplemental small pump 46 arranged to be driven by the source of motion 41. This pump has a suction conduit 47 branched so that it is in communication with each one of the containers 44. It is thus apparent that whenever electric motor 41 is intermittently operated, the vacuum pump 46 is also operated for the same period, and evacuation takes place.

Each of the doors 45 is arranged to coact with a flexible gasket 48 (Fig. 5) so that evacuation of the container serves to urge the door 45 into sealing relation with the container. In the present instance each of the doors is shown as pivoted on a hinge such as 49 and provided with a knob 50 for facilitating the opening and closing of the door. Any convenient means can be provided for holding door 45 closed before the evacuation is sufficient to do so.

When it is desired to open any one of the containers 44, it is of course necessary to break the vacuum. This is accomplished by pulling outwardly on the knob 50. Each of these knobs has a rod 51 extending into an aperture 52 in the door, and urged inwardly as by compression spring 53. Thus in normal position the tapered closure 54 arranged on the inner side of the knob 50 seats against the edge of aperture 52, and keeps the container 44 sealed. However, upon pulling outwardly on the knob 50 this seal can be broken and air can pass around the rod 51 into the container 44.

It is also advisable to close off communication between the container 44 and the vacuum conduit 47 whenever the door is opened; for otherwise the seal would be broken for all of the containers 44. This is accomplished by the aid of an automatic valve mechanism illustrated to best advantage in Figs. 5 and 6. The vacuum conduit 47 is there shown as provided with a valve body 55 intermediate the vacuum pump and the container 44 under consideration. This valve body has a valve seat 56 with which cooperates a valve closure 57. This valve closure is joined to a long rod 58 extending out of the valve body 55. The valve closure 57 is urged toward closing position by a compression spring 59 placed around the rod 58 and acting against a washer 60 restrained from axial movement as by a pin 61.

When the door 45 is closed, the rod 58 is urged upwardly as viewed in Fig. 5 to open the valve 55, against the force of the comparatively weak spring 59. In this way the vacuum connections are established while the door is closed. To push the rod 58 upwardly when the door closes, use is made of a lever 62 pivoted at one end in the door 45 and having an end contacting with the lower extremity of rod 58. Lever 62 is pivotally joined at an intermediate point to rod 51. Spring 53 is strong enough to keep lever 62 in the position indicated, overcoming the force of spring 59. However, as soon as knob 50 is pulled, lever 62 is pulled downwardly, releasing rod 58 and permitting the valve 55 to close, thereby interrupting communication between the vacuum conduit 47 and the particular container 44 under consideration.

In lieu of the mechanically actuated vacuum pump 46, it is possible of course to utilize an ejector system similar to that shown in Fig. 3.

Such a form of the invention is shown in Fig. 7. In this form the doors 73 of containers 63 are shown as located inside of a compartment 64 of a refrigerator 65, which may be an ordinary ice refrigerator having a drain 66. A trap 67 may be provided beneath the drain 66 for carrying away the water resulting from the melting ice.

In this instance the main compartment 64 is adapted to be closed by hinged door 68. A vacuum producing apparatus 69, acting by the passage of liquid past an opening communicating with the containers 63, is adapted to be operated by the passage of water downwardly through a conduit 70 and out through conduit 71, finally discharging into the trap 67. The apparatus 69 is connected as by conduit 72, through a branch pipe leading to each of the containers 63. Each of doors 73 has a control knob 74, similar to knob 50 described in connection with Figs. 4, 5 and 6. Furthermore, if desired, an automatic pressure controller 75 can be provided to cause a valve 76 to be opened only when the pressure in container 63 reaches a limiting high value. Valve 76 thus controls the operation of the vacuum producing means 69.

The advantages of combined refrigeration and evacuation for the preservation of foods, and for preventing contamination can be readily obtained for large commercial installations. Such an installation is shown in Figs. 8, 9 and 10, adapted to be used for example in a butcher shop, or the like.

In this form of the invention, there is a large refrigerated container 76 having a large hinged door 77. This door can be provided with the usual handle 78, as well as a finger control crank 79. This crank operates on a valve plunger 80 acting to break the vacuum inside of the refrigerated container. This is accomplished by providing a conical valve closure 81 cooperating with a similarly formed valve seat 82 formed around an aperture extending through door 77. The closure 81 is normally held in closed position by the compression spring 83, as well as by air pressure acting on the outside of the door 77.

Evacuation of the refrigerating compartment is accomplished by the aid of a vacuum conduit 84 leading to an evacuating pump 85. This pump can be driven by an electric motor 86. A pressure control 87 can be provided for motor 85, to cause it to evacuate the refrigerating compartment whenever the pressure therein is undesirably high. This can be accomplished as by causing the pressure control 87 to act on a switch mechanism 88 controlling the motor 86.

It is also desirable to ensure that the motor 86 will be deenergized whenever the door 77 is opened, irrespective of the pressure conditions. Thus as shown in Figs. 8 and 10, one edge of the door 77 can act against a plunger 89 located in a recess 90 in the wall of the refrigerator. When the door 77 is closed, plunger 89 serves to press the two resilient contact arms 91 and 92 together to complete the circuit for motor 86. When the door 77 is opened, the natural resilience of arms 91 and 92 causes them to separate, thereby ensuring an interruption in the flow of current to motor 86.

In this type of installation, the evacuation of the main refrigerator compartment can be carried to any desired degree by appropriate design of the evacuating apparatus. No difficulty is encountered in breaking the seal when it is desired to open the refrigerator, by appropriate manipulation of the crank 79.

We claim:

1. In combination, a refrigerator, a container therein, a door for the container, a gasket for the door, means for evacuating the container, and means, supported on the door, for permitting at will, the entry of air into the container, as well as for disconnecting the evacuating means from the container.

2. In combination, a mechanical refrigerator having an intermittently actuated source of motion for operating the refrigerator, a plurality of containers in said refrigerator, each of said containers having a cover, common means for evacuating the containers and thereby causing sealing of the covers, said means being connected to the source of motion, and means whereby any one of the covers can be unsealed at will without destroying the seal of the other containers.

3. In combination, a food container, a door therefor, a gasket for the door, means forming an opening from the container to permit evacuation thereof, a valve for the opening urged toward closing position, means on the door adapted to resiliently maintain the valve in open position when the door is shut, valve means on the door adapted to admit air to the container and operable from the exterior of the door, the first mentioned means and the valve means being connected so that opening the valve means permits the valve to close.

4. In combination, a refrigerator, and a container therein, said container having a cover as well as a sealing gasket between the cover and container, and provided with means for optionally evacuating the container and for sealing the cover by air pressure external of the cover, or for admitting air to the container to permit release of the cover, said evacuating and air admitting means including a common control member and valve means controlled by the member.

5. In combination, a refrigerator having an intermittently operated electric motor for operating the refrigerator, a container in the refrigerator, a vacuum pump for evacuating the container, means forming a sealing cover for the container, said cover sealing the container due to the evacuation of the container, means for permitting entry of air at will into the container for opening it, means for disconnecting the container from the vacuum pump, and means whereby operation of the means for permitting entry of air into the container will cause substantially simultaneous actuation of the said disconnecting means.

CHARLES O'N. WEISSER.
ERNEST H. SEVERSON.